(12) United States Patent
Kitahata et al.

(10) Patent No.: US 9,180,865 B2
(45) Date of Patent: Nov. 10, 2015

(54) HYBRID VEHICLE CONTROL APPARATUS

(75) Inventors: Takeshi Kitahata, Toyota (JP); Tooru Matsubara, Toyota (JP); Atsushi Tabata, Okazaki (JP); Tatsuya Imamura, Okazaki (JP); Yuji Iwase, Mishima (JP); Tomohito Ono, Gotenba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/344,498

(22) PCT Filed: Sep. 12, 2011

(86) PCT No.: PCT/JP2011/700772
§ 371 (c)(1),
(2), (4) Date: Aug. 27, 2014

(87) PCT Pub. No.: WO2013/038481
PCT Pub. Date: Mar. 21, 2013

(65) Prior Publication Data
US 2014/0371964 A1    Dec. 18, 2014

(51) Int. Cl.
*B60L 9/00* (2006.01)
(Continued)

(52) U.S. Cl.
CPC .............. *B60W 20/00* (2013.01); *B60K 6/445* (2013.01); *B60W 10/02* (2013.01); *B60W 10/06* (2013.01); *B60W 10/08* (2013.01); *B60W 10/12* (2013.01); *B60W 20/40* (2013.01); *B60K 2006/381* (2013.01); *B60W 2710/083* (2013.01); *B60Y 2400/421* (2013.01); *Y02T 10/6239* (2013.01); *Y02T 10/6286* (2013.01); *Y10S 903/93* (2013.01)

(58) Field of Classification Search
None
See application file for complete search history.

(56) References Cited

U.S. PATENT DOCUMENTS

2009/0026994 A1*  1/2009  Namuduri et al. ............ 318/565
2010/0125019 A1*  5/2010  Tabata et al. ...................... 477/3

FOREIGN PATENT DOCUMENTS

| JP | 2005 138779 | 6/2005 |
|---|---|---|
| JP | 2008 265600 | 11/2008 |
| JP | 2010-274805 | 12/2010 |

OTHER PUBLICATIONS

International Preliminary Report on Patentability issued Feb. 2, 2012, in PCT/JP2011/070772, filed Sep. 12, 2011 (with English language translation).

(Continued)

*Primary Examiner* — Adam Alharbi
(74) *Attorney, Agent, or Firm* — Oblon, McClelland, Maier & Neustadt, L.L.P.

(57) ABSTRACT

A control apparatus for a hybrid vehicle is provided with a differential mechanism having a first rotary element, a second rotary element serving as an input rotary member and connected to an engine, and a third rotary element serving as an output rotary member, an electric motor connected to said first rotary element, and a locking mechanism configured to fix an output shaft of said engine to a stationary member, the control apparatus comprising: an electric motor drive control portion configured to reduce an absolute value of a torque of said electric motor before said locking mechanism is changed from a locking state in which said output shaft is fixed to the stationary member while a drive force of said electric motor is transmitted to said third rotary element, to an unlocking state in which said output shaft is released from the stationary member.

5 Claims, 8 Drawing Sheets

(51) Int. Cl.
*B60W 20/00* (2006.01)
*B60K 6/445* (2007.10)
*B60W 10/06* (2006.01)
*B60W 10/08* (2006.01)
*B60W 10/02* (2006.01)
*B60W 10/12* (2012.01)
*B60K 6/38* (2007.10)

(56) References Cited

OTHER PUBLICATIONS

International Search Report Issued Nov. 15, 2011 in PCT/JP11/070772 Filed Sep. 12, 2011.

\* cited by examiner

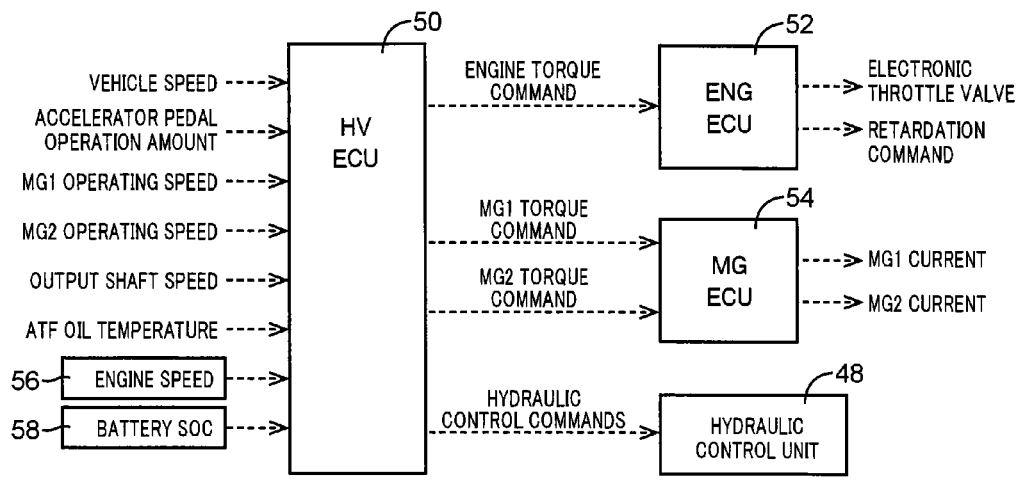
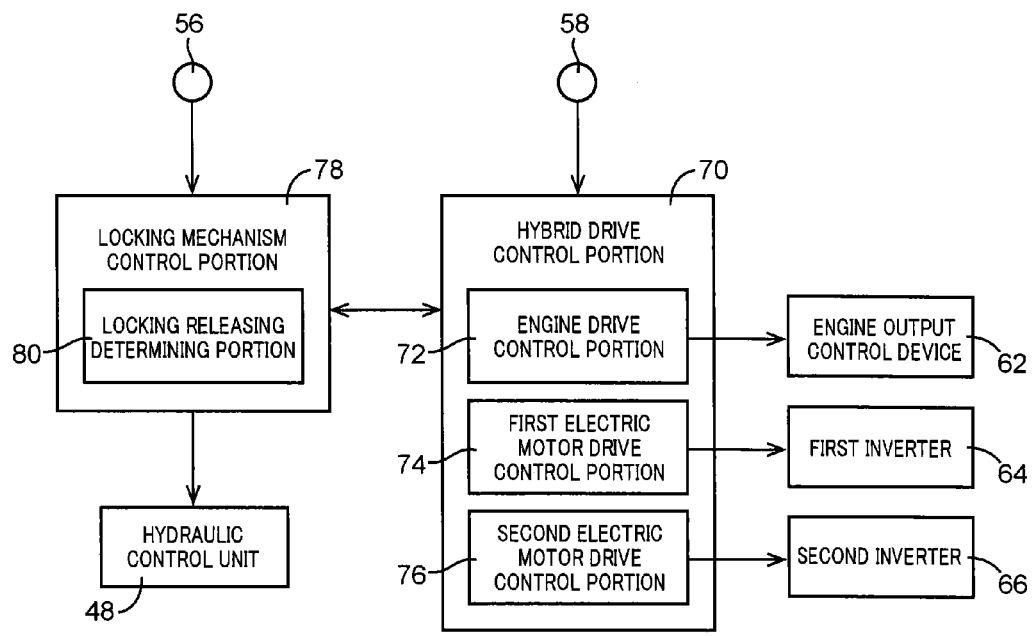

HYBRID VEHICLE CONTROL APPARATUS

TECHNICAL FIELD

The present invention relates to a control apparatus for a hybrid vehicle provided with a mechanism for locking an output shaft of an engine, and more particularly to an improvement thereof to prevent a reverse operation of the engine upon releasing of locking of the output shaft.

BACKGROUND ART

There is well known a hybrid vehicle provided with: a differential mechanism having a first rotary element, a second rotary element serving as an input rotary member connected to an engine, and a third rotary element serving as an output rotary member; a first electric motor connected to the above-indicated first rotary element; and a second electric motor operatively connected to a power transmitting path from the above-indicated third rotary element to vehicle drive wheels. There has been proposed a technique to provide this type of hybrid vehicle with a locking mechanism configured to fix an output shaft of the above-indicated engine to a housing or any other stationary member. Patent Document 1 discloses a drive force output device as an example of this technique. According to this technique, the output shaft of the above-indicated engine is locked while the engine is held at rest (in a non-operated state), so that both of the above-indicated first and second electric motors can be used as a vehicle drive power source, whereby an output of the hybrid vehicle can be increased during running of the hybrid vehicle in a motor drive mode.

PRIOR ART DOCUMENT

Prior Art Documents

Patent Documents

Patent Document 1: JP-2005-138779 A
Patent Document 2: JP-2008-265600 A

SUMMARY OF THE INVENTION

Object Achieved By The Invention

However, the above-described technique suffers from a possibility of a reverse rotary motion of the output shaft of the above-described engine due to a variation of an operating response of a brake actuator provided in the above-indicated locking mechanism upon releasing of locking of the output shaft by the locking mechanism during running of the hybrid vehicle in an EV drive mode in which the hybrid vehicle is driven with a torque of the above-indicated electric motors with the above-described engine held at rest, that is, upon transition of the locking mechanism from its locking state to lock the output shaft of the engine to its unlocking state permitting a rotary motion of the output shaft. This problem was found in the process of an intensive study by the inventors of the present invention in an effort to improve the quality of the hybrid vehicle.

The present invention was made in view of the background art described above. It is therefore an object of the present invention to provide a control apparatus for a hybrid vehicle, which permits prevention of a reverse operation of the engine upon releasing of locking of the output shaft.

Means For Achieving The Object

The object indicated above is achieved according to a first aspect of the present invention, which provides a control apparatus for a hybrid vehicle provided with a differential mechanism having a first rotary element, a second rotary element serving as an input rotary member and connected to an engine, and a third rotary element serving as an output rotary member, an electric motor connected to the above-described first rotary element, and a locking mechanism configured to fix an output shaft of the above-described engine to a stationary member, the control apparatus being characterized in that an absolute value of a torque of the above-described electric motor is reduced before the above-described locking mechanism is changed from a locking state in which the above-described output shaft is fixed to the stationary member while a drive force of the above-described electric motor is transmitted to the above-described third rotary element, to an unlocking state in which the output shaft is released from the stationary member.

Advantages of the Invention

According to the first aspect of the invention described above, the absolute value of the torque of the above-described electric motor is reduced before the above-described locking mechanism is changed from the locking state in which the above-described output shaft is fixed to the stationary member while the drive force of the above-described electric motor is transmitted to the above-described third rotary element, to the unlocking state in which the output shaft is released from the stationary member. Accordingly, the reverse operation of the above-indicated engine can be effectively prevented even where the locking mechanism is changed into the unlocking state at an earlier point of time due to a variation of the operating response of a brake actuator provided in the above-indicated locking mechanism, for instance. Namely, the present first aspect of the invention provides a control apparatus for a hybrid vehicle, which control apparatus prevents the reverse operation of the engine upon releasing of locking of the output shaft.

According to a second aspect of this invention, the control apparatus according to the above-described first aspect of the invention is configured such that the torque of the above-described electric motor operates the above-described engine in a reverse direction while the drive force of the electric motor is transmitted to the above-described third rotary element. According to this second aspect, the reverse operation of the engine can be suitably prevented upon releasing of locking of the output shaft by the locking mechanism where the reverse operation of the engine tends to easily take place due to early releasing of locking of the output shaft.

According to a third aspect of the invention, the control apparatus according to the above-described first or second aspect of the invention is configured such that the torque generated by the above-described electric motor to operate the above-described engine in a forward direction is increased before the locking mechanism is changed from the locking state to the unlocking state. According to this third aspect, the reverse operation of the engine can be effectively and practically prevented upon releasing of locking of the output shaft by the locking mechanism.

According to a fourth aspect of the invention, the control apparatus according to any one of the above-described first through third aspects of the invention is configured such that a second electric motor is connected to a power transmitting path between the above-described third rotary element and drive wheels, and an absolute value of a torque of the above-described second electric motor is maintained or increased when the absolute value of the torque of the above-described electric motor is reduced during the locking mechanism is changed from the locking state to the unlocking state. According to this fourth aspect, the reduction of an output torque to be transmitted to the drive wheels can be effectively prevented upon releasing of locking of the output shaft.

According to a fifth aspect of the invention, the control apparatus according to any one of the above-described first through fourth aspects of the invention is configured such that a determination as to whether the above-described output shaft of the above-described engine has been released from the above-described stationary member is made, on the basis of a change of a speed of rotation of the output shaft by the torque of the above-described electric motor controlled while the locking mechanism is changed from the locking state to the unlocking state. According to this fifth aspect, the releasing of locking of the output shaft can be suitably and practically detected.

BRIEF DESCRIPTION OF THE DRAWINGS

FIG. 2 is a view illustrating major portions of an electric system provided to implement hybrid drive controls of the drive system of FIG. 1;

FIG. 3 is a functional block diagram for explaining major control functions of electronic control devices for the drive system of FIG. 1;

MODE FOR CARRYING OUT THE INVENTION

Figure 1:
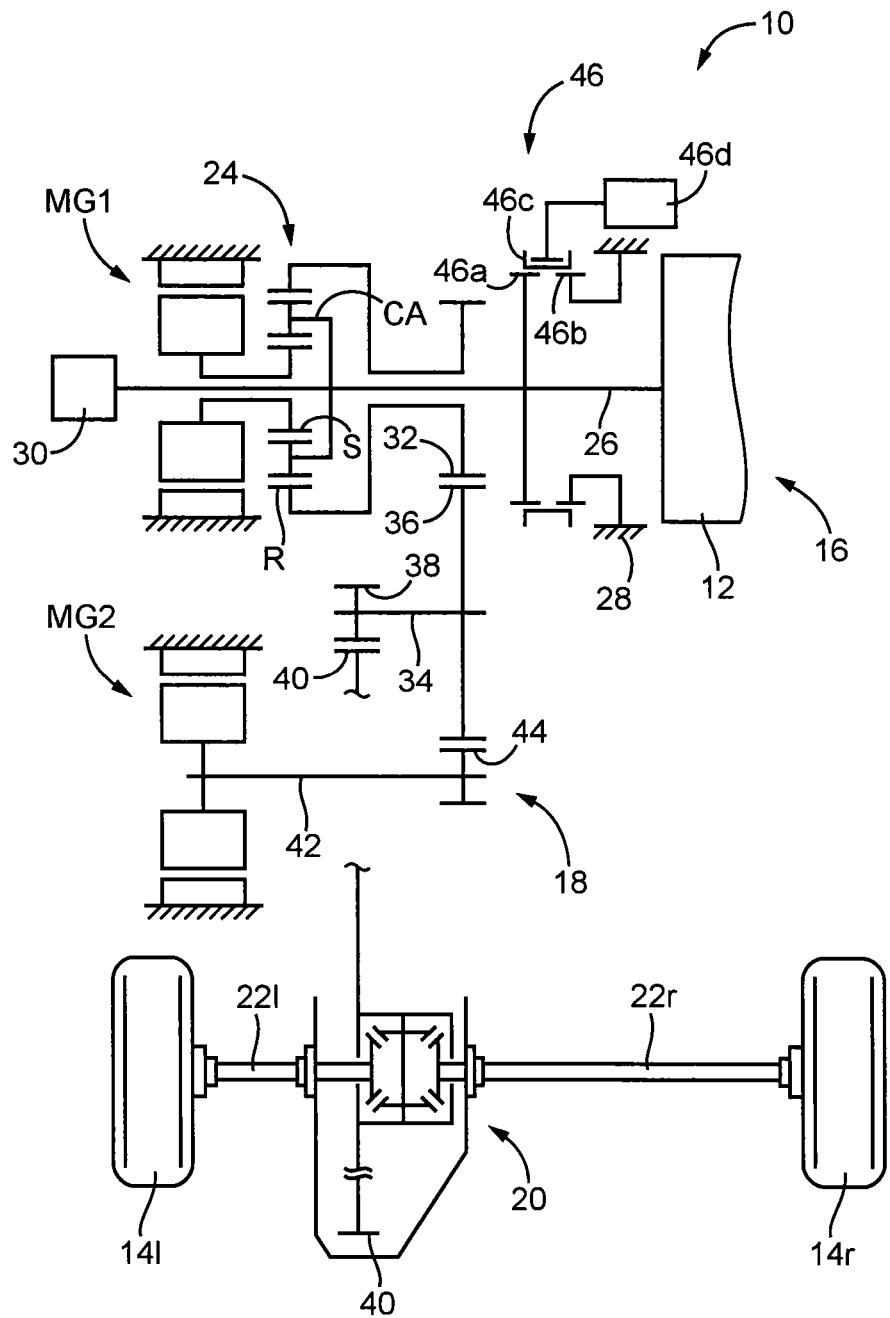
FIG. 1 is a schematic view illustrating an arrangement of a hybrid vehicle drive system to which the present invention is suitably applicable.

The hybrid vehicle to which the present invention is applicable is preferably provided with a second electric motor in addition to the electric motor which is connected to the above-described first rotary element and which is provided as a first electric motor. The second electric motor, which serves as a drive power source, is connectable to a power transmitting path between the third rotary element of the above-described differential mechanism and vehicle drive wheels in a power transmittable manner. This type of hybrid vehicle is driven in one of a plurality drive modes which is selected according to a running state of the hybrid vehicle. Those drive modes include a motor drive mode in which at least one of the above-described first and second electric motors is operated as the vehicle drive power source while the above-described engine is held at rest, and an engine drive mode in which the above-described engine is operated as the vehicle drive power source to transmit its drive force to the vehicle drive wheels mechanically.

The above-described locking mechanism is switchable between the locking state in which the output shaft of the above-described engine is fixed (locked) to the stationary member and which is established in the drive mode in which the engine is held at rest, and the unlocking state in which the above-described output shaft is permitted to be rotated and which is established in the drive mode in which the engine is operated. In the locking state of this locking mechanism in which the above-described output shaft is fixed to the stationary member, both of the above-described first and second electric motors can be operated as the vehicle drive power source, so that the hybrid vehicle can be driven with a comparatively large output drive force. It is also noted that the present invention is suitably applicable to a so-called "plug-in hybrid vehicle" which is provided with a battery which has a comparatively large capacity and which is chargeable with a household electric power source.

The above-described locking mechanism is preferably a positive clutch (dog clutch) well known in the art. For example, this positive clutch is provided with a first member, a second member, a sleeve and an actuator. The first member has a plurality of teeth formed in its radially outer portion, and is disposed coaxially with the output shaft of the above-described engine such that the first member is rotated together with the output shaft. The second member has a plurality of teeth corresponding to the teeth of the first member, and is fixed to the above-indicated stationary member. The sleeve has a spline formed in its radially inner portion and engageable with the teeth of the above-indicated first and second members, and is axially movable relative to the first and second members in meshing engagement with these members. The actuator is provided to move the sleeve in the axial direction. This positive clutch is placed in a selected one of a locking state and an unlocking state. In the locking state, the spline of the above-described sleeve is held in meshing engagement with the teeth of both of the above-described first and second members, so that the output shaft of the above-described engine is fixed to the stationary member. In the unlocking state, the spline of the above-described sleeve is held in meshing engagement with the teeth of the above-described second member but is not held in meshing engagement with the teeth of the above-described first member, so that locking of the output shaft of the above-described engine to the stationary member is released to permit a rotary motion of the output shaft. Preferably, the above-described actuator is a hydraulically operated actuator to move the above-indicated sleeve with a hydraulic pressure (relative to the first and second members in the axial direction). However, the actuator may be an electromagnetic actuator to move the sleeve with an electromagnetic force, for instance.

Alternatively, the above-described locking mechanism is preferably a hydraulically operated frictional coupling device of a multiple-disc type well known in the art, which is switchable between its engaged and released states by a hydraulic actuator. Further, the present invention is also applicable to a hybrid vehicle provided with any other type of locking mechanism such as an electromagnetically operated frictional coupling device or a magnetic powder clutch switchable between its engaged and released states by an electromagnetic actuator, and an alternator which functions as a regenerative braking device. Namely, the present invention is applicable to a wide variety of hybrid vehicle provided with a locking mechanism arranged to fix the output shaft of the above-described engine to the stationary member.

Referring to the drawings, preferred embodiments of the present invention will be described in detail.

First Embodiment

FIG. 1 is the schematic view illustrating an arrangement of a hybrid vehicle drive system 10 (hereinafter referred to simply as a "drive system 10") to which the present invention is suitably applicable. This drive system 10 shown in FIG. 1, which is suitably used for an FF (front-engine front-drive) type vehicle, is provided with a drive power source (main drive power source) in the form of an engine 12, and is further provided with a first driving portion 16, a second driving portion 18, a differential gear device 20 and a pair of left and right axles 22*l* and 22*r* (hereinafter referred to as "axles 22", unless otherwise specified), which are disposed in a power transmitting path between a pair of left and right vehicle drive wheels 14*l* and 14*r* (hereinafter referred to as "wheels 14", unless otherwise specified).

The above-described engine 12 is an internal combustion engine such as a gasoline or diesel engine, which generates a drive force by combustion of a fuel injected into its cylinders. The above-indicated first driving portion 16 is provided with a planetary gear set 24 having three rotary elements consisting of a sun gear S, a carrier CA and a ring gear R, and a first electric motor MG1 connected to the sun gear S of the planetary gear set 24. Between a crankshaft 26 serving as an output shaft of the above-indicated engine 12, and a stationary member in the form of a housing (transaxle housing) 28, there is disposed a positive clutch 46 serving as a locking mechanism.

The crankshaft 26 of the above-described engine 12 also serves as an input shaft of the above-described first driving portion 16 connected to the carrier CA of the above-described planetary gear set 24. To this crankshaft 26, there is connected a mechanical oil pump 30 which is operated by the above-described engine 12 to generate a hydraulic pressure to be applied to a hydraulic control unit 48 described below. Further, the ring gear R of the above-described planetary gear set 24 is connected to an output gear 32. Namely, the above-described planetary gear set 24 functions as a differential mechanism having the sun gear S serving as the first rotary element, the carrier CA serving as an input rotary member in the form of the second rotary element and connected to the above-described engine 12, and the ring gear R serving as an output rotary member in the form of the third rotary element.

The above-indicated output gear 32 is held in meshing engagement with a large-diameter gear 36 formed integrally with an intermediate output shaft 34 which is disposed in parallel with the crankshaft 26 serving as the input shaft of the above-described first driving portion 16. A small-diameter gear 38 which is also formed integrally with the intermediate output shaft 34 is held in meshing engagement with an input gear 40 of the above-indicated differential gear device 20. The above-indicated large-diameter gear 36 is held in meshing engagement with a second output gear 44 connected to an output shaft 42 of a second electric motor MG2. Although each of the above-indicated first electric motor MG1 and second electric motor MG2 is preferably a motor/generator having a function of a motor (electric motor) operable to generate a drive force, and a function of a generator (electric generator) operable to generate a reaction force, the above-indicated first electric motor MG1 at least functions as the generator, while the above-indicated second electric motor MG2 at least functions as the motor.

In the drive system 10 arranged as described above, a rotary motion of the engine 12 in the above-described first driving portion 16 is transmitted from the above-indicated output gear 32 through the differential mechanism in the form of the above-described planetary gear set 24, to the input gear 40 of the above-indicated differential gear device 20 through the large-diameter gear 36 fixed to the above-indicated intermediate output shaft 34, and the small-diameter gear 38 the number of teeth of which is smaller than that of the large-diameter gear 36. The rotary motion of the above-indicated output gear 32 is transmitted to the input gear 40 of the above-indicated differential gear device 20, at a predetermined speed reduction ratio determined by the number of teeth of the above-indicated large-diameter gear 36 and the number of teeth of the above-indicated small-diameter gear 38. The differential gear device 20 functions as a final speed reducing device.

A rotary motion of the first electric motor MG1 in the above-described first driving portion 16 is transmitted to the above-indicated output gear 32 through the above-described planetary gear set 24, and to the input gear 40 of the above-described differential gear device 20 through the large-diameter gear 36 and small-diameter gear 38 fixed to the above-indicated intermediate output shaft 34. A rotary motion of the second electric motor MG2 in the above-described second driving portion 18 is transmitted to the large-diameter gear 36 fixed to the above-indicated intermediate output shaft 34 through the above-indicated output shaft 42 and second output gear 44, and to the input gear 40 of the above-described differential gear device 20 through the large-diameter gear 36 and small-diameter gear 38. That is, the drive system 10 according to the present embodiment is able to use any of the above-described engine 12, first electric motor MG1 and second electric motor MG2 as the vehicle drive power source.

The above-indicated positive clutch 46 is preferably provided with an engine-side member 46*a*, a housing-side member 46*b*, a sleeve 46*c* and an actuator 46*d*. The engine-side member 46*a* has a plurality of teeth formed in its radially outer portion, and is disposed coaxially with the above-described crankshaft 26 such that the engine-side member 46*a* is rotated together with the crankshaft 26. The housing-side member 46*b* has a plurality of teeth corresponding to the teeth of the engine-side member 46*a*, and is fixed to the above-indicated housing 28. The sleeve 46*c* has a spline formed in its radially inner portion and engageable with the teeth of the above-indicated engine-side member 46*a* and housing-side member 46*b*, and is axially movable (slidable) relative to the above-indicated engine-side member 46*a* and housing-side member 46*b* in meshing engagement with these engine-side and housing-side members 46*a* and 46*b*. The actuator 46*d* is provided to move the sleeve 46*c* in the axial direction. Preferably, the actuator 46*d* is a hydraulically operated actuator to move the above-indicated sleeve 46*c* according to a hydraulic pressure Pbcr received from the hydraulic control unit 48, between a locking state in which the spline formed in the radially inner portion of the sleeve 46*c* is in meshing engagement with the teeth of both of the above-indicated engine-side and housing-side members 46a and 46b, and an unlocking state in which the spline is in meshing engagement with the teeth of only the above-indicated housing-side member 46b but is not in meshing engagement with the teeth of the above-indicated engine-side member 46a.

When the above-described sleeve 46c is moved by the above-described actuator 46d as a result of a rise of the hydraulic pressure Pbcr received from the above-described hydraulic control unit 48, to establish the locking state in which the above-described sleeve 46c is in meshing engagement with the teeth of both of the above-described engine-side and housing-side members 46a and 46b, for example, the above-indicated crankshaft 26 of the engine 12 is fixed to the above-indicated housing 28 by the above-described positive clutch 46, so that the crankshaft 26 is not rotatable relative to the above-indicated housing 28. When the sleeve 46c is moved under a biasing force of a return spring provided in the above-described actuator 46d as a result of a drop of the hydraulic pressure Pbcr received from the above-described hydraulic control unit 48, to establish the unlocking state in which the above-indicated sleeve 46c is in meshing engagement with the teeth of only the above-indicated housing-side member 46b but is not in meshing engagement with the teeth of the above-indicated engine-side member 46a, on the other hand, the above-indicated crankshaft 26 is released from the housing 28 by the above-indicated positive clutch 46, so that the crankshaft 26 is rotatable relative to the above-indicated housing 28.

FIG. 2 is the view illustrating major portions of an electric system provided to implement hybrid drive controls of the drive system 10 of the present embodiment. As illustrated in FIG. 2, the above-described drive system 10 is provided with a hybrid drive control electronic control device 50, an engine control electronic control device 52, and an electric motor control electronic control device 54. Each of these electronic control devices 50, 52 and 54 includes a so-called microcomputer incorporating a CPU, a ROM, a RAM and an input-output interface, and is operable to perform signal processing operations according to programs stored in the ROM, while utilizing a temporary data storage function of the RAM, for implementing the hybrid drive controls of the above-described engine 12, first electric motor MG1 and second electric motor MG2, and various other controls such as a control of the above-described positive clutch 46. In the present embodiment, the above-indicated electronic control device 52 is configured to principally implement a drive control (output torque control) of the above-indicated engine 12, and the above-indicated electronic control device 54 is configured to principally implement drive controls (output torque controls) of the above-indicated first and second electric motors MG1 and MG2, while the above-indicated electronic control device 50 is configured to principally implement overall controls of the above-described drive system 10 via the above-indicated electronic control devices 52 and 54. However, these electronic control devices 50, 52 and 54 need not be mutually independent control devices, and may be provided by a single integrated control apparatus. Further, each of the above-indicated electronic control devices 50, 52 and 54 may consist of a plurality of mutually independent control modules.

As shown in FIG. 2, the above-indicated electronic control device 50 is configured to receive various signals from various sensors and switches provided in the above-described drive system 10. Namely, the above-indicated electronic control device 50 receives: an output signal of a vehicle speed sensor indicative of a vehicle running speed V; an output signal of an accelerator pedal operation amount sensor indicative of an operation amount $A_{CC}$ of an accelerator pedal corresponding to a vehicle operator's required amount of a vehicle output; an output signal of an MG1 speed sensor indicative of an operating speed $N_{MG1}$ of the above-described first electric motor MG1; an output signal of an MG2 speed sensor indicative of an operating speed $N_{MG2}$ of the above-described second electric motor MG2; an output signal of an output shaft speed sensor indicative of a rotating speed $N_{OUT}$ of the above-indicated output gear 32; an output signal of an ATF temperature sensor indicative of a temperature $T_{ATF}$ of a working oil supplied to various portions of the above-described drive system 10; an output signal of an engine speed sensor 56 indicative of an operating speed $N_E$ of the above-described engine 12; and an output signal of a battery SOC sensor 58 indicative of an electric energy amount SOC stored in a battery (electric-energy storage device) not shown, or signals indicative of input and output limit values corresponding to the electric energy amount SOC, namely, an input limit value Win and an output limit value Wout.

The above-indicated electronic control device 50 is further configured to apply a drive control command for the above-described engine 12 to the above-indicated electronic control device 52, and drive control commands for the above-described first and second electric motors MG1 and MG2 to the above-described electronic control device 54. Described more specifically, the electronic control device 50 applies the following engine torque commands to the above-indicated electronic control device 52 through an engine output control device 62 (shown in FIG. 3), as signals for controlling an output of the above-described engine 12: a drive signal to be applied to a throttle actuator for controlling an opening angle $\theta_{TH}$ of an electronic throttle valve provided in an intake pipe of the engine 12; a fuel supply amount control signal for controlling an amount of supply of a fuel by a fuel injecting device into the intake pipe; and an ignition signal for controlling a timing of ignition of the engine 12 by an igniting device. Further, the electronic control device 50 applies an MG1 torque command and an MG2 torque command to the above-indicated electronic control device 54 through a first inverter 64 and a second inverter 66 (shown in FIG. 3), as command signals for controlling amounts of electric energy to be supplied from the battery not shown to the above-indicated first and second electric motors MG1 and MG2, respectively. In addition, for controlling operation of the positive clutch 46, the electronic control device 50 applies a hydraulic command signal to a solenoid-operated control valve provided in the hydraulic control unit 48 to regulate the hydraulic pressure Pbcr to be applied to the above-described actuator 46d, for controlling an output pressure of the solenoid-operated control valve.

FIG. 3 is the functional block diagram for explaining major control functions of the above-indicated electronic control devices 50, 52 and 54. Preferably, the above-described electronic control device 50 is functionally provided with a hybrid drive control portion 70 and a locking mechanism control portion 78 which are shown in FIG. 3. However, those control portions 70 and 78 may be incorporated in any one of the above-described electronic control devices 50, 52 and 54, or in a control device other than the electronic control devices 50, 52 and 54. Further, the above-indicated electronic control device 52 may be functionally provided with an engine drive control portion 72 included in the hybrid drive control portion 70, while the above-described electronic control device 54 may be functionally provided with a first electric motor drive control portion 74 and a second electric motor drive control portion 76 included in the hybrid drive control portion 70. Thus, the above-indicated control portions may be provided dispersedly in the above-indicated electronic control devices 50, 52 and 54, which are configured to perform data processing operations by mutual data communications with each other.

The hybrid drive control portion 70 shown in FIG. 3 is configured to implement the hybrid drive controls of the above-described drive system 10. Described more specifically, the hybrid drive control portion 70 controls an operation of the above-described engine 12 through the above-described engine output control device 62, and controls a vehicle driving operation and an electricity generating (regenerative operation) of the above-described first electric motor MG1 and second electric motor MG2 through the above-described first and second inverters 64 and 66, respectively. To implement these hybrid drive controls, the hybrid drive control portion 70 includes the engine drive control portion 72, first electric motor drive control portion 74 and second electric motor drive control portion 76, the functions of which will be described.

The above-indicated engine drive control portion 72 is basically configured to control the operation of the above-described engine 12 through the above-described engine output control device 62. Described more specifically, the engine drive control portion 72 applies the engine output control signals including the following signals, to the above-indicated engine output control device 62 through the above-described electronic control device 52: the drive signal for driving the throttle actuator to control the opening angle $\theta_{TH}$ of the electronic throttle valve provided in the intake pipe of the above-described engine 12, so that the output of the engine 12 coincides with a target engine output (a target speed or a target output torque) calculated by the above-described electronic control device 50; the fuel supply amount control signal for controlling the amount of supply of the fuel by the fuel injecting device into the intake pipe; and the ignition signal for controlling the timing of ignition of the above-described engine 12 by the igniting device.

The above-described first electric motor drive control portion 74 is basically configured to control the operation of the above-described first electric motor MG1 through the above-described first inverter 64. Described more specifically, the first electric motor drive control portion 74 applies control signals to the above-described first inverter 64 through the above-described electronic control device 54, for controlling input and output amounts of electric energy between the battery not shown, and the above-indicated first electric motor MG1, so that an output of the above-indicated first electric motor MG1 coincides with a target first electric motor output (a target speed or a target output torque) calculated by the above-described electronic control device 50.

The above-described second electric motor drive control portion 76 is basically configured to control the operation of the above-described second electric motor MG2 through the above-described second inverter 66. Described more specifically, the second electric motor drive control portion 76 applies control signals to the above-described second inverter 66 through the above-described electronic control device 54, for controlling input and output amounts of electric energy between the battery not shown, and the above-indicated second electric motor MG2, so that an output of the above-indicated second electric motor MG2 coincides with a target second electric motor output (a target speed or a target output torque) calculated by the above-described electronic control device 50.

The above-described hybrid drive control portion 70 is configured to implement the hybrid drive controls of the above-described drive system 10 through the above-described engine drive control portion 72, first electric motor drive control portion 74 and second electric motor drive control portion 76. For instance, the hybrid drive control portion 70 calculates a required vehicle drive force $F_{req}$ that is a target value of a vehicle drive force to be transmitted to the above-indicated wheels 14, on the basis of the accelerator pedal operation amount $A_{CC}$ detected by the accelerator pedal operation amount sensor, and the vehicle running speed V detected by the vehicle speed sensor, and according to a predetermined map not shown and stored in a memory device. Then, the hybrid drive control portion 70 operates at least one of the above-described engine 12, first electric motor MG1 and second electric motor MG2, to generate a required output in accordance with the calculated required vehicle drive force $F_{req}$ in order to improve fuel efficiency and to reduce exhaust gas. Namely, the hybrid drive control portion 70 selectively establishes one of a motor drive mode (EV mode), an engine drive mode, and a hybrid drive mode, depending upon a running state of the vehicle. In the motor drive mode, at least one of the above-indicated first electric motor MG1 and second electric motor MG2 is operated as the vehicle drive power source while the above-indicated engine 12 is held at rest. In the engine drive mode, only the above-indicated engine 12 is operated as the vehicle drive power source, so that a drive force of the engine 12 is mechanically transmitted to the above-indicated wheels 14. In the hybrid drive mode, the above-indicated engine 12 and second electric motor MG2 (or first electric motor MG1 in addition to the second electric motors MG2) are operated as the vehicle drive power source.

Preferably, the above-indicated hybrid drive control portion 70 is configured to switch the vehicle drive mode between the motor drive mode in which the above-indicated engine 12 is held at rest, and the engine drive mode or the hybrid drive mode in which the engine 12 is operated, on the basis of the electric energy amount SOC stored in the battery, which is detected by the above-described battery SOC sensor 58. If the stored electric energy amount SOC detected by the above-indicated battery SOC sensor 58 is larger than a predetermined threshold value $S_{bo}$, for example, the hybrid drive control portion 70 establishes the motor drive mode in which the above-indicated engine 12 is held at rest. If the stored electric energy amount SOC is not larger than the predetermined threshold value $S_{bo}$, the hybrid drive control portion 70 establishes the engine drive mode or hybrid drive mode in which the above-indicated engine 12 is operated. Alternatively, the hybrid drive control portion 70 is preferably configured to switch the vehicle drive mode on the basis of the accelerator pedal operation amount $A_{CC}$ detected by the above-indicated accelerator pedal operation amount sensor, and the vehicle running speed V detected by the vehicle speed sensor.

The above-described locking mechanism control portion 78 is configured to control an operation of the locking mechanism in the form of the above-described positive clutch 46. Described more specifically, the locking mechanism control portion 78 controls the hydraulic pressure Pbcr to be applied from the above-described hydraulic control unit 48 to the above-described actuator 46d, to control an operating state of the positive clutch 46, that is, to lock the crankshaft 26 of the above-indicated engine 12 (to the housing 28) or to unlock the crankshaft 26. If the motor drive mode in which the above-indicated engine 12 is held at rest is established by the above-indicated hybrid drive control portion 70, for instance, the locking mechanism control portion 78 raises the hydraulic pressure Pbcr to be applied from the above-indicated hydraulic control unit 48 to the above-indicated actuator 46d, to operate the actuator 46d for moving the above-indicated sleeve 46c to establish the locking state in which the sleeve 46c is held in meshing engagement with the teeth of both of the above-indicated engine-side member 46a and housing-side member 46b. That is, the locking mechanism control portion 78 controls the operation of the above-indicated positive clutch 46 so as to fix the crankshaft 26 of the above-indicated engine 12 to the above-indicated housing 28. If the engine drive mode or hybrid drive mode in which the above-indicated engine 12 is operated is established by the above-indicated hybrid drive control portion 70, the locking mechanism control portion 78 lowers the hydraulic pressure Pbcr to be applied from the above-indicated hydraulic control unit 48 to the above-indicated actuator 46d, to operate the actuator 46d for moving the above-indicated sleeve 46c to establish the unlocking state in which the sleeve 46c is held in meshing engagement with the teeth of the above-indicated housing-side member 46b but is not held in meshing engagement with the teeth of the above-indicated engine-side member 46a. That is, the locking mechanism control portion 78 controls the operation of the above-indicated positive clutch 46 so as to release the above-indicated crankshaft 26 from the housing 28.

Figure 4:
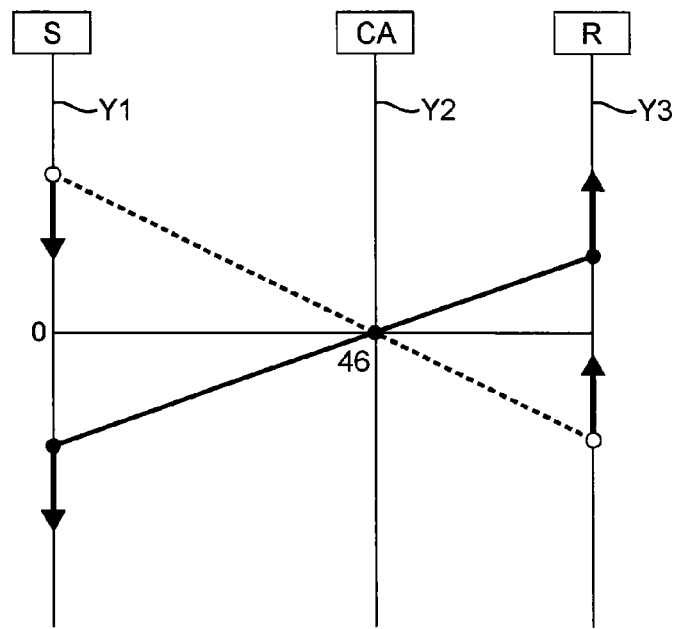
FIG. 4 is a collinear chart permitting indication of relative rotating speeds of three rotary elements of a differential mechanism provided in the drive system of FIG. 1, during running of the hybrid vehicle with its engine held at rest.
Figure 5:
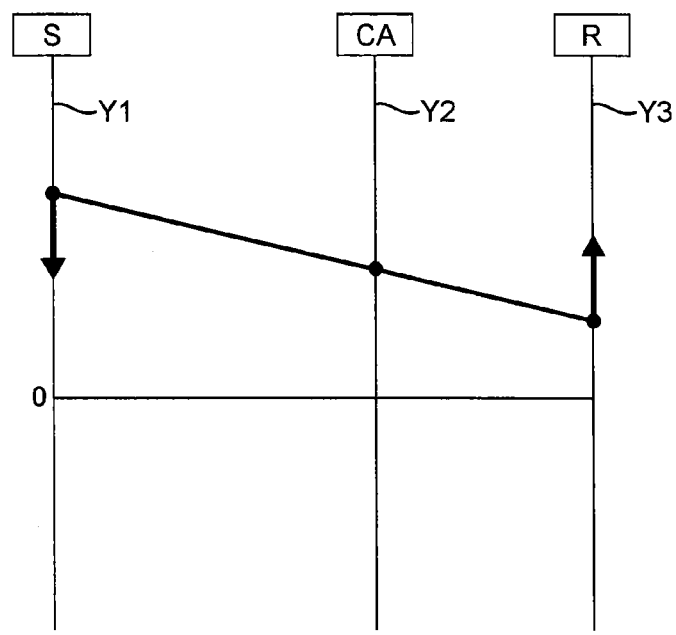
FIG. 5 is a collinear chart permitting indication of the relative rotating speeds of the three rotary elements of the differential mechanism provided in the drive system of FIG. 1, during running of the hybrid vehicle with its engine held in an operating state.

FIGS. 4 and 5 are collinear charts permitting indication of relative rotating speeds of the three rotary elements of the differential mechanism in the form of the above-described planetary gear set 24. Vertical lines Y1-Y3 arranged in this order in the rightward direction in the collinear charts respectively indicate the rotating speed of the first rotary element in the form of the sun gear S connected to the above-described first electric motor MG1, the rotating speed of the second rotary element in the form of the above-indicated carrier CA connected to the above-described engine 12, and the rotating speed of the third rotary element in the form of the above-indicated ring gear R connected to the above-described second electric motor MG2 through the above-described large-diameter gear 36 and second output gear 44. FIG. 4 indicates the relative rotating speeds of the rotary elements in the motor drive mode in which the above-indicated engine 12 is placed in held in a non-operated state (held at rest), while FIG. 5 indicates the relative rotating speeds of the rotary elements in the engine drive mode or hybrid drive mode in which the above-indicated engine 12 is placed in an operated state.

Referring to FIGS. 4 and 5, an operation of the above-described drive system 10 will be described. The above-described planetary gear set 24 is the differential mechanism provided with the sun gear S serving as the first rotary element, the carrier CA serving as the second rotary element and the input rotary member, and the ring gear R serving as the third rotary element and the output rotary member. The sun gear S serving as the above-indicated first rotary element is connected to the above-described first electric motor MG1, and the carrier CA serving as the second rotary element is connected to the above-described engine 12, while the ring gear R serving as the third rotary element is operatively connected to the above-described second electric motor MG2 through the above-indicated large-diameter gear 36 and second output gear 44. Thus, the above-described planetary gear set 24, first electric motor MG1 and second electric motor MG2 constitute major parts of an electrically controlled continuously variable transmitting portion.

The operation of the above-described drive system 10 in the above-indicated motor drive mode will be described by reference to FIG. 4. In the motor drive mode, the above-described engine 12 is placed in the non-operated state, with its operating speed being zero. Preferably, the above-described positive clutch 46 is placed in the locking state by the above-described locking mechanism control portion 78 through the above-described hydraulic control unit 48, to fix the above-indicated crankshaft 26 to the housing 28, so that a rotary motion of the above-indicated engine 12 is inhibited. In this state, a vehicle driving torque of the above-indicated second electric motor MG2 is transmitted to the above-described wheels 14 as a vehicle drive force in the forward running direction of the vehicle. Further, a reaction torque of the above-indicated first electric motor MG1 is transmitted to the above-indicated wheels 14 as a vehicle drive force in the forward running direction of the vehicle. Namely, the reaction torque of the above-indicated first electric motor MG1 raises the rotating speed of the ring gear R serving as the output rotary member, in the forward direction. A transition of a broken line to a solid line in FIG. 4 indicates a rise of the operating speed of the above-indicated second electric motor MG2 (the rotating speed of the ring gear R) when the operating speed of the above-indicated first electric motor MG1 is lowered from a value indicated by the broken line to a value indicated by the solid line. That is, the above-described drive system 10 is configured to permit the use of both of the above-indicated first and second electric motors MG1 and MG2 as the vehicle drive power source, while the crankshaft 26 of the above-indicated engine 12 is locked by the above-described positive clutch 46, so that an output of the vehicle in the motor drive mode can be increased where the vehicle is a so-called "plug-in hybrid vehicle" the battery of which can be charged with a household electric power source.

Next, the operation of the above-described drive system 10 in the above-indicated engine drive mode or hybrid drive mode will be described by reference to FIG. 5. In the engine or hybrid drive mode, the above-described first electric motor MG1 operates as the electric generator when the reaction torque of the first electric motor MG1 is transmitted to the above-indicated sun gear S while the output torque of the above-indicated engine 12 is transmitted to the above-indicated carrier CA. While the rotating speed of the above-indicated ring gear R (output shaft speed) is held constant, the operating speed $N_E$ of the above-indicated engine 12 can be changed continuously (without a stepping change) by changing the operating speed of the above-indicated first electric motor MG1. Namely, the operating speed $N_E$ of the above-indicated engine 12 can be controlled to a value suitable for the highest fuel economy, by controlling the vehicle driving torque or reaction torque of the above-indicated first electric motor MG1. This manner of the hybrid drive control is called a "mechanical distribution type" or "split type".

In a drive system like the above-described drive system 10 provided with the positive clutch 46 to fix the crankshaft 26 of the above-described engine 12 to the housing 28, there is a risk of a reverse rotary motion of the crankshaft 26 of the engine 12 to due to a variation of the operating response of the above-indicated actuator 46d according to the prior art technique, upon transition from the locking state in which the crankshaft 26 is fixed to the housing 28, to the unlocking state in which the crankshaft 26 is released from the housing 28. Namely, the carrier CA the rotating speed of which corresponds to the operating speed of the above-indicated engine 12 is rotated in the reverse direction (in the direction opposite to the forward operating direction of the engine 12), as indicated by a one-dot chain line in FIG. 6, depending upon the value of the torque (reaction torque) of the above-indicated first electric motor MG1, so that the above-indicated engine 12 has a risk of a reverse operation (an operation in the direction opposite to the forward operating direction) of the engine 12, as indicated in an area enclosed by a broken line in FIG. 6.

Figure 7:
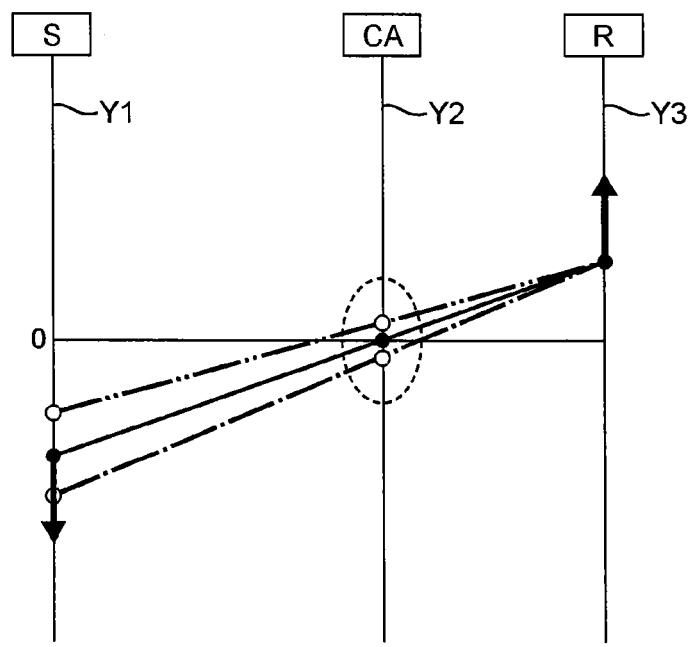
FIG. 7 is a collinear chart indicating the relative rotating speeds of the three rotary elements of the differential mechanism provided in the drive system of FIG. 1, and explaining a torque balancing of an output shaft upon releasing of locking of the engine.

The drive system like the above-described drive system 10 provided with the locking mechanism in the form of the positive clutch 46 (dog clutch) to fix the crankshaft 26 of the above-indicated engine 12 to the housing 28 has an advantage of reduction of a risk of dragging of the crankshaft 26 with respect to the housing 28, but undesirably requires a comparatively large drive force for operating the above-indicated positive clutch 46 upon transition from the locking state to fix the crankshaft 26 to the housing 28, to the unlocking state to release the crankshaft 26 from the housing 28, due to the above-described construction of the positive clutch 46. That is, the above-indicated crankshaft 26 is subjected to a torque in the reverse operating direction of the above-indicated engine 12, depending upon the value of the torque (reaction torque) of the above-indicated first electric motor MG1, as indicated by a one-dot chain line in FIG. 7, while the crankshaft 26 is subjected to a torque in the forward operating direction of the above-indicated engine 12, depending upon the value of the torque (vehicle driving torque) of the above-indicated second electric motor MG2, as indicated by a two-dot chain line in FIG. 7. To change the sleeve 46c of the above-indicated positive clutch 46 from the locking state in which the sleeve 46c is held in meshing engagement with the teeth of both of the above-indicated engine-side and housing-side members 46a and 46b, to the unlocking state, the values of the torque acting on those members, namely, the values of the torque acting on the carrier CA (crankshaft 26) in the forward and reverse directions indicated in an area enclosed by a broken line in FIG. 7 are required to be almost balanced with respect to each other (i.e. torque acting on the crankshaft 26 is substantially zero). If the torque values are not almost balanced with respect to each other, there is a risk of difficulty of transition from the locking state of the sleeve 46c of the above-indicated positive clutch 46 to the unlocking state. Even where the torque values are not almost balanced with respect to each other, the sleeve 46c can be changed from the locking state to the unlocking state by operating the actuator 46d with a comparatively large drive force. However, the actuator 46d operable with such a comparatively large drive force tends to be large-sized, so that there is a risk of an increase of the required overall size of the drive system.

In view of the drawback of the prior art technique described above, the drive system 10 according to the present embodiment is controlled to reduce an absolute value of a torque $T_{MG1}$ of the above-indicated first electric motor MG1, upon transition of the locking mechanism in the form of the above-described positive clutch 46 from the locking state in the EV mode in which the above-indicated crankshaft 26 is fixed to the housing 28 by the positive clutch 46 while the drive force of at least the above-indicated first electric motor MG1 used as the vehicle drive power source is transmitted to the third rotary element in the form of the ring gear R, to the unlocking state in which the locking of the crankshaft 26 by the positive clutch 46 is released. Namely, the absolute value of the torque $T_{MG1}$ of the above-indicated first electric motor MG1 is reduced by the above-described first electric motor drive control portion 74 to reduce the reaction torque of the above-indicated crankshaft 26, before the above-indicated positive clutch 46 is changed by the above-indicated locking mechanism control portion 78, from the locking state in which the crankshaft 26 is locked, to the unlocking state in which the locking of the crankshaft 26 by the above-indicated positive clutch 46 is released.

Figure 6:
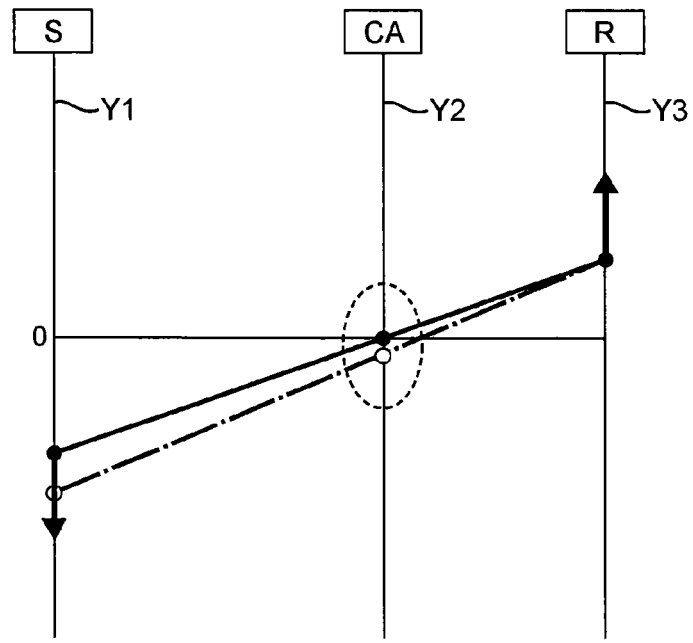
FIG. 6 is a collinear chart indicating the relative rotating speeds of the three rotary elements of the differential mechanism provided in the drive system of FIG. 1, and a reverse operation of the engine upon releasing of locking of the engine.

It is preferable that upon transition of the positive clutch 46 from the locking state to fix the above-indicated crankshaft 26 to the housing 28, to the unlocking state to release the crankshaft 26 from the housing 28, the torque $T_{MG1}$ of the above-indicated first electric motor MG1 is changed to operate the above-indicated engine 12 in the forward direction before the above-indicated positive clutch 46 is changed from the locking state to the unlocking state. Namely, the torque $T_{MG1}$ of the above-indicated first electric motor MG1 serves as a reaction torque which operates the above-indicated engine 12 in the reverse direction while a drive force of the above-indicated first electric motor MG1 operated as the vehicle drive power source is transmitted to the third rotary element in the form of the above-indicated ring gear R. In this locking state, the torque $T_{MG1}$ of the above-indicated first electric motor MG1 is changed by the above-described first electric motor drive control portion 74 to operate the above-indicated engine 12 in the forward direction, before the above-described positive clutch 46 is changed to the unlocking state by the above-described locking mechanism control portion 78. When the torque $T_{MG1}$ of the above-indicated first electric motor MG1 is the reaction torque as shown in FIG. 6, for example, this reaction torque is initially reduced (the vehicle driving torque is increased), and then the above-indicated positive clutch 46 is changed to the unlocking state. Since the torque $T_{MG1}$ of the above-indicated first electric motor MG1 is changed to operate the above-indicated engine 12 in the forward direction before the above-indicated positive clutch 46 is changed from the locking state to the unlocking state, the sleeve 46c of the above-indicated positive clutch 46 can be moved with a comparatively small drive force, to change the positive clutch 46 to the unlocking state, and the reverse operation of the above-indicated engine 12 due to a variation of the operating response of the above-indicated actuator 46d can be effectively prevented.

It is also preferable that an absolute value of a torque $T_{MG2}$ of the above-described second electric motor MG2 is maintained or increased by the above-described second electric motor drive control portion 76 when the absolute value of the torque $T_{MG1}$ of said first electric motor MG1 is reduced by the above-described first electric motor drive control portion 74 before the above-described positive clutch 46 is changed from the locking state to fix the above-described crankshaft 26 to the housing 28, to the unlocking state to release the crankshaft 26 from the housing 28. In other words, the absolute value of the torque $T_{MG2}$ of the above-described second electric motor MG2 is controlled so as not to be reduced. This control makes it possible to prevent temporary reduction of the output torque of the above-described wheels 14 and effectively prevent consequent reduction of the vehicle drive force when the absolute value of the torque $T_{MG1}$ of said first electric motor MG1 is reduced.

As shown in FIG. 3, the above-described locking mechanism control portion 78 includes a locking releasing determining portion 80, which is configured to determine whether the locking of the crankshaft 26 to the housing 28 has been released or not, on the basis of a change of the speed of rotation of the crankshaft 26 of the engine 12 by the torque of the above-described first electric motor MG1 controlled while the above-described positive clutch 46 is changed from the locking state to fix the above-indicated crankshaft 26 to the housing 28, to the unlocking state to release the crankshaft 26 from the housing 28. Described more specifically, the locking releasing determining portion 80 makes the determination as to the releasing of locking of the crankshaft 26 to the housing 28, on the basis of a change of the engine speed $N_E$ detected by the engine speed sensor 56 a predetermined length of time after the moment of initiation of the control implemented by the above-described first electric motor drive control portion 74 to reduce the absolute value of the torque $T_{MG1}$ of the above-indicated first electric motor MG1. For instance, the locking releasing determining portion 80 determines that the locking of the above-indicated crankshaft 26 to be housing 28 has been released, if the engine speed $N_E$ detected by the engine speed sensor 56 the predetermined length of time after the moment of initiation of the above-indicated control has reached a predetermined threshold value $N_{bo}$ (>0) as a result of a change of the operating direction of the above-indicated first electric motor MG1 from the negative direction to the positive direction (which corresponds to the forward operating direction of the engine 12). In the present embodiment, the above-indicated determination is made before initiation of a sequential control to start the above-indicated engine 12, and this sequential control is initiated after the affirmative determination (that the locking of the crankshaft 26 to the housing 28 has been released) is obtained.

Figure 8:
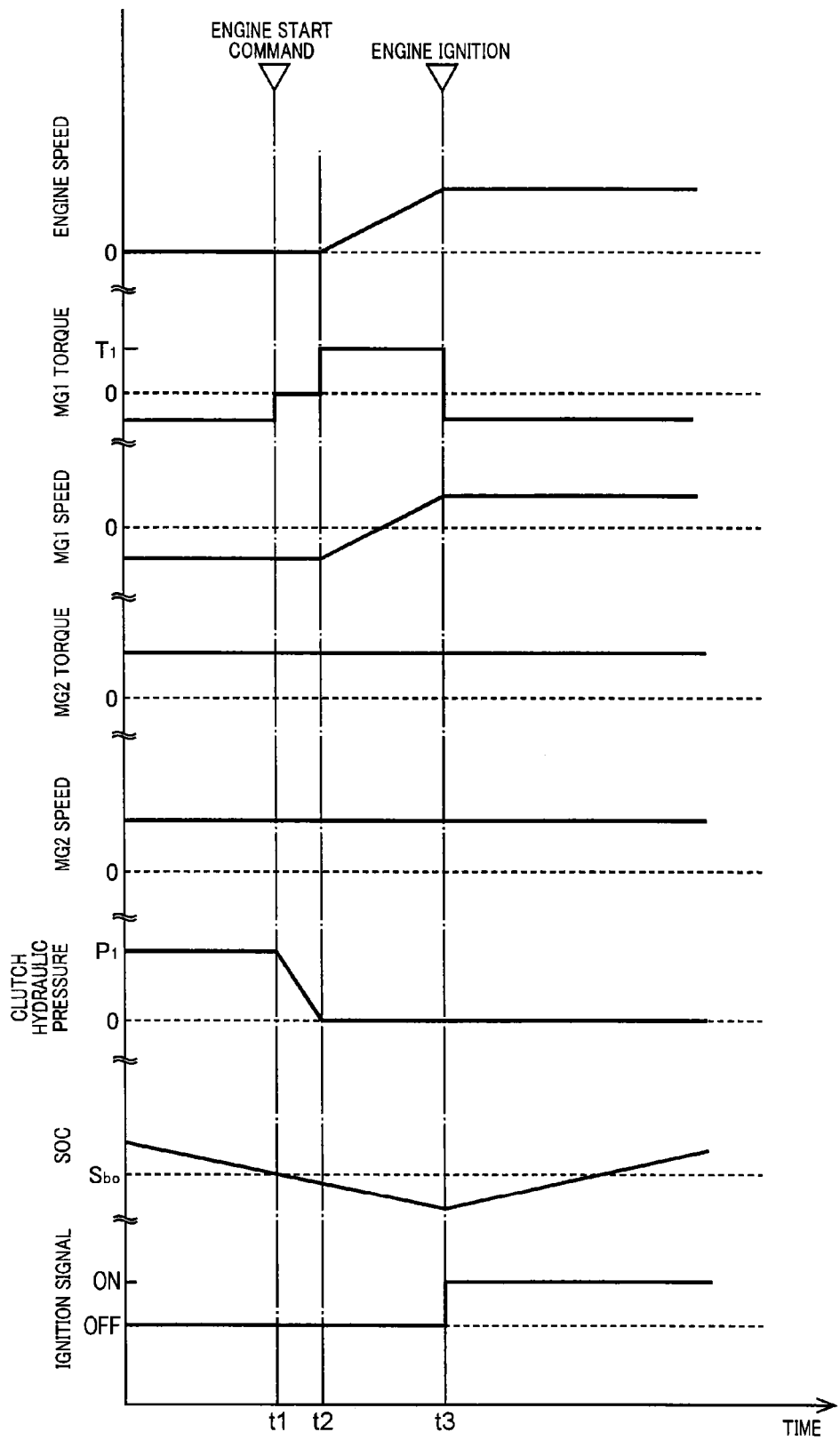
FIG. 8 is a time chart for explaining controls of the drive system of FIG. 1 in the illustrated embodiment of the present invention.

FIG. 8 is the time chart for explaining controls implemented by the above-described electronic control device 50 in the present embodiment. The controls illustrated in FIG. 8 are implemented when the vehicle drive mode is changed from the drive mode in which the above-described engine 12 is not operated, to the drive mode in which the engine 12 is operated. Prior to a point of time t1, the hydraulic pressure Pbcr (clutch pressure) to be applied to the actuator 46d of the above-described positive clutch 46 is equal to $P_1$ at which the above-described sleeve 46c is held in meshing engagement with the teeth of both of the above-described engine-side and housing-side members 46a and 46b. Further, the electric energy amount SOC stored in the battery at the point of time t1 is larger than the threshold value $S_{bo}$.

According to the controls illustrated in FIG. 8, the electric energy amount SOC stored in the battery has been reduced below the threshold value $S_{bo}$, and the determination is made to switch the vehicle drive mode from the drive mode in which the above-described engine 12 is not operated, to the drive mode in which the engine 12 is operated at t1. That is, the determination to start the above-indicated engine 12 is made, and an engine start command is generated. At a point of time substantially coincident with the point of time t1 at which the engine start command is generated, the reaction torque of the above-described first electric motor MG1 is reduced, preferably to substantially zero, as indicated in FIG. 8. At this point of time, the torque of the above-described second electric motor MG2 is not reduced, but is held at the value at or prior to the point of time t1. During a time period from the point of time t1 to a point of time t2, the clutch pressure, namely, the hydraulic pressure Pbcr to be applied to the actuator 46d of the above-described positive clutch 46 is gradually lowered from the above-indicated value $P_1$ to zero. Then, at the point of time t2, the sleeve 46c of the above-indicated positive clutch 46 is disengaged from the teeth of the above-indicated engine-side member 46a, and is held in meshing engagement with the teeth of only the above-indicated housing-side member 46b. That is, the locking of the above-described crankshaft 26 to the housing 28 by the above-indicated positive clutch 46 is released. At this point of time t2, the torque of the above-indicated first electric motor MG1 is raised to a predetermined value $T_1$ (>0), and is held at this value $T_1$ up to a point of time t3. During a time period from the point of time t2 to the point of time t3, the operating speed of the above-indicated first electric motor MG1 is gradually raised, so that the rotating speed of the crankshaft 26 of the above-indicated engine 12 is gradually raised. Then, at the point of time t3, the above-indicated engine 12 is ignited, so that the operation of the engine 12 by itself is initiated. At the point of time t3, the torque of the above-indicated first electric motor MG1 is restored to the value prior to initiation of the controls (to the value at or prior to the point of time t1). The controls described above make it possible to suitably start the above-indicated engine 12 without a reverse operation.

Figure 9:
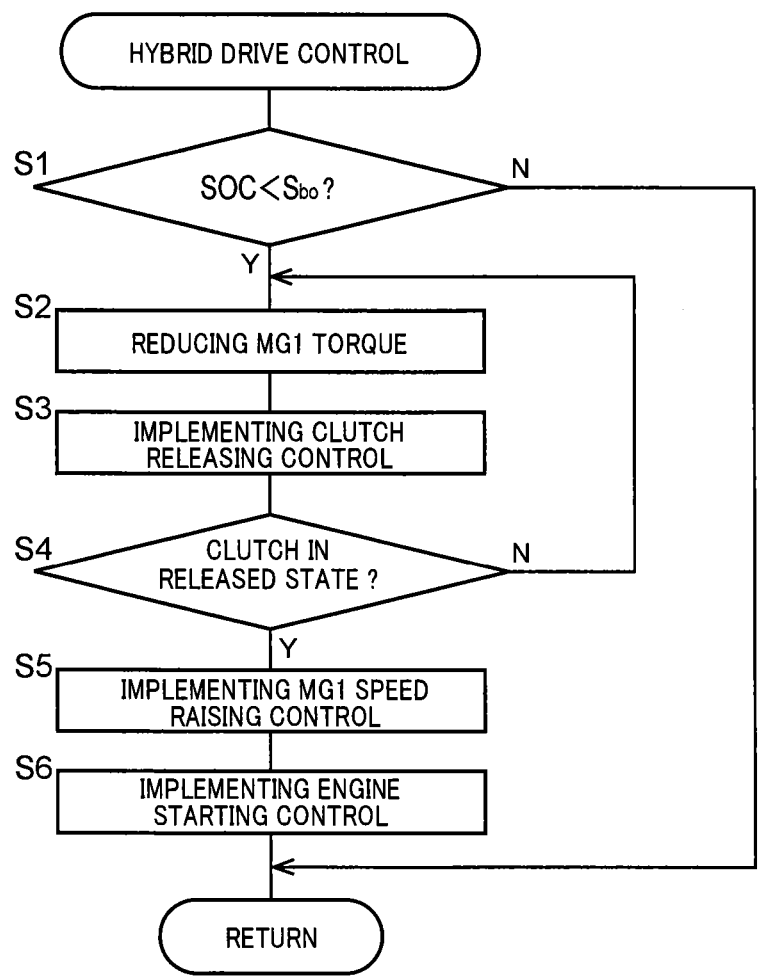
FIG. 9 is a flow chart for explaining major hybrid drive controls of the drive system of FIG. 1 implemented by the electronic control device in the illustrated embodiment.

FIG. 9 is the flow chart for explaining major hybrid drive controls of the above-described drive system 10 implemented by the above-described electronic control device 50. This control routine is repeatedly executed with a predetermined cycle time.

The control routine is initiated with a step S1 (hereinafter "step" being omitted), to determine whether the electric energy amount SOC stored in the battery, which is detected by the battery SOC sensor 58, is smaller than the predetermined threshold value $S_{bo}$. If a negative determination is obtained in S1, one cycle of execution of the present control routine is terminated. If an affirmative determination is obtained in S1, the above-described drive system 10 is placed in the engine drive mode in which the above-described engine 12 is operated, and the command to start the engine 12 is generated. Then, the control flow goes to S2 to reduce the absolute value of the torque of the above-described first electric motor MG1, for example, to substantially zero the torque. The control flow then goes to S3 to initiate a releasing control of the above-described positive clutch 46, in which the hydraulic pressure Pbcr to be applied to the actuator 46d is gradually lowered. Then, the control flow goes to S4 to determine whether the above-indicated positive clutch 46 has been changed to the released state, that is, whether the locking of the above-indicated crankshaft 26 to the housing 28 has been released. This determination is made on the basis of a change of the engine speed $N_E$ detected by the engine speed sensor 56. For instance, the determination is made as to whether the engine speed $N_E$ detected by the above-indicated engine speed sensor 56 a predetermined length of time after the moment of the affirmative determination in S1 has been raised to or more than the predetermined threshold value $N_{bo}$. If a negative determination is obtained in S4, the control flow goes back to S2 and the subsequent steps. If an affirmative determination is obtained in S4, the control flow goes to S5 to initiate a rise of the operating speed $N_{MG1}$ of the above-indicated first electric motor MG1. Then, the control flow goes to S6 to initiate a starting control of the above-indicated engine 12. Namely, the rotating speed of the above-indicated crankshaft 26 is further raised by the above-indicated first electric motor MG1 while the reaction force is generated by the above-described second electric motor MG2, and the above-indicated engine 12 is ignited, so that the operation of the engine 12 by itself is initiated. Thus, the present control routine is terminated. In the controls implemented as described above, S1, S2, S5 and S6 correspond to the operation of the above-described hybrid drive control portion 70, and S3 and S4 correspond to the operation of the above-described locking mechanism control portion 78, while S4 corresponds to the operation of the above-described locking releasing determining portion 80.

Another embodiment of this invention will be described in detail by reference to the drawings. It is noted that the same reference signs will be used to identify the corresponding elements of the different embodiments, which will not be described redundantly.

Second Embodiment

Figure 10:
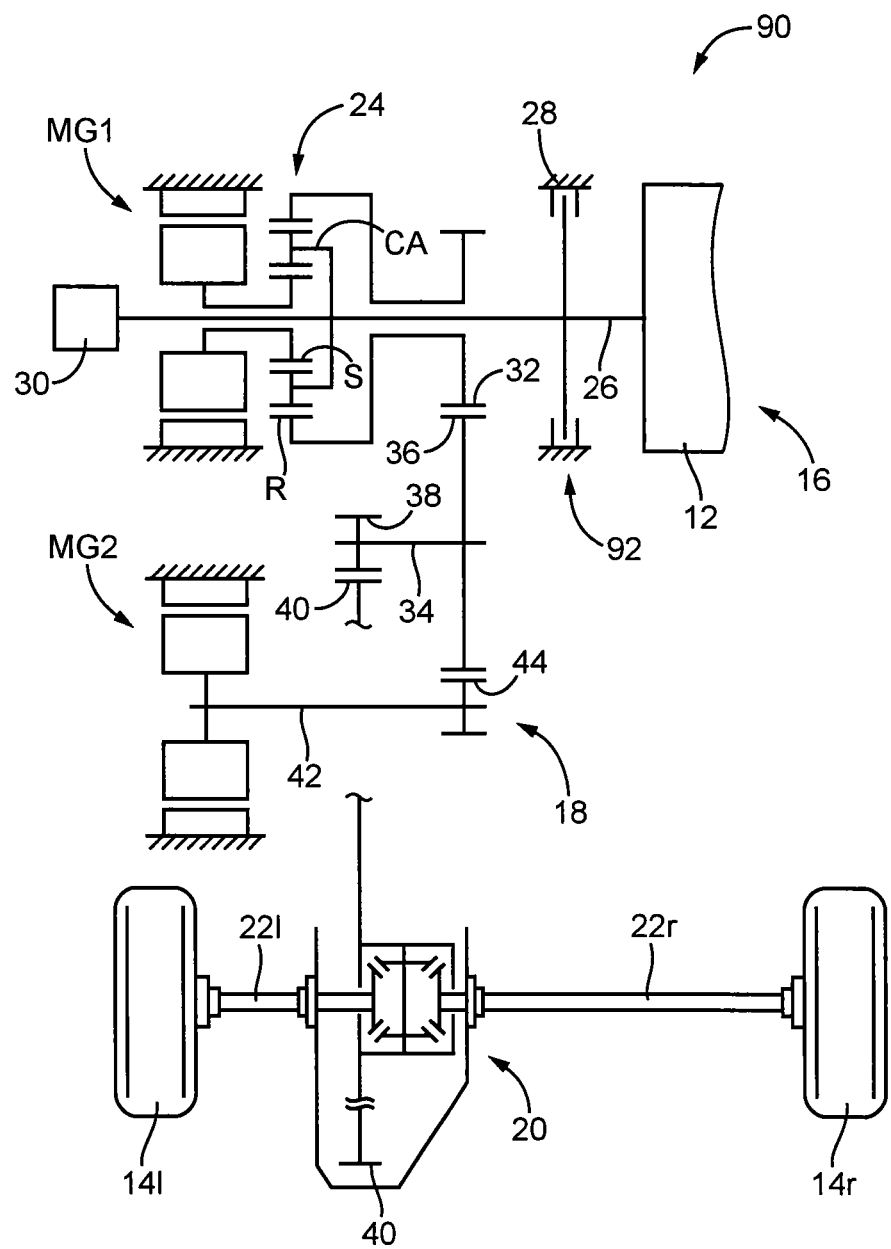
FIG. 10 is a schematic view illustrating an arrangement of a hybrid vehicle drive system according to another embodiment of the present invention.

FIG. 10 is the schematic view illustrating an arrangement of a hybrid vehicle drive system 90 according to another embodiment of the present invention. This drive system 90 shown in FIG. 10 is provided with a friction clutch 92 serving as a locking mechanism for fixing the crankshaft 26 of the above-described engine 12 to the stationary member in the form of the housing 28. This friction clutch 92 is preferably a hydraulically operated frictional coupling device of a multiple-disc type, for example, which is switchable between its engaged and released states by a hydraulic actuator, and which is preferably a friction brake of a wet type. The friction clutch 92 is selectively placed in the fully engaged state or the fully released state according to the hydraulic pressure Pbcr received from the above-described hydraulic control unit 48. The friction clutch 92 may be configured such that it is operable in a slipping state (a partially engaged state) as necessity. In the fully released state of the above-indicated friction clutch 92, the crankshaft 26 of the above-indicated engine 12 is rotatable relative to the stationary member in the form of the above-indicated housing 28. In the fully engaged state of the above-indicated friction clutch 92, the crankshaft 26 of the above-indicated engine 12 is not rotatable relative to the above-indicated housing 28. Namely, the crankshaft 26 of the above-indicated engine 12 is fixed (locked) to the above-indicated housing 28, when the above-indicated friction clutch 92 is placed in the fully engaged state.

The locking mechanism control portion 78 incorporated in the electronic control device 50 of the above-described drive system 90 controls the operation of the above-described friction clutch 92 serving as the locking mechanism. Described more specifically, the locking mechanism control portion 78 controls the hydraulic pressure Pbcr to be applied from the above-described hydraulic control unit 48 to the hydraulic actuator of the above-indicated friction clutch 92, to control an operating state of the friction clutch 92, namely, to lock the crankshaft 26 of the above-described engine 12 (to fix the crankshaft 26 to the housing 28) or unlock the crankshaft 26. Further, the above-described hybrid drive control portion 70 and locking mechanism control portion 78 implement the controls similar to those implemented in the above-described first embodiment, upon transition of the operating state of the friction clutch 92. Namely, the hybrid drive control portion 70 reduces the absolute value of the torque $T_{MG1}$ of the above-described first electric motor MG1, upon transition of the friction clutch 92 from its locking state to fix the above-indicated crankshaft 26 to the housing 28, to its unlocking state to release the crankshaft 26 from the housing 28. The hybrid drive control portion 70 is preferably configured to change the torque $T_{MG1}$ of the above-described first electric motor MG1 to operate the above-indicated engine 12 in the forward direction before the above-indicated friction clutch 92 is changed to the unlocked state. Further, the above-described second electric motor drive control portion 76 is preferably configured to maintain or increase the absolute value of the torque $T_{MG2}$ of the above-described second electric motor MG2 when the absolute value of the torque $T_{MG1}$ of the above-indicated first electric motor MG1 is reduced under the control of the above-described first electric motor drive control portion 74. Further, the above-described locking releasing determining portion 80 is configured to make the above-described determination upon transition of the friction clutch 92 to the unlocked state.

In the drive system 90 provided with the locking mechanism in the form of the above-described friction clutch 92, the operating speed $N_{MG1}$ of the above-indicated first electric motor MG1 is preferably gradually raised before the friction clutch 92 is changed to the fully released state. Namely, the above-indicated first electric motor drive control portion 74 reduces the absolute value of the torque $T_{MG1}$ of the above-described first electric motor MG1 before the above-indicated locking mechanism control portion 78 initiates the control to release the above-indicated friction clutch 92, for changing the friction clutch 92 from the locking state to fix the above-indicated crankshaft 26 to the housing 28 (from its fully engaged state), to the unlocking state to release the locking of the crankshaft 26 by the friction clutch 92. After initiation of the control to release the friction clutch 92, the above-indicated first electric motor drive control portion 74 implements the control to gradually increase the operating speed $N_{MG1}$ of the above-indicated first electric motor MG1 before the friction clutch 92 is fully released (changed to the fully released state). Where the friction clutch 92 is of a multiple-disc type, for instance, the torque values acting on the crankshaft 26 described above by reference to FIG. 7 are not particularly required to be balanced, during switching of the friction clutch 92 from the engaged state to the released state so that the starting control of the engine 12 can be completed in a minimum length of time without a reverse operation of the engine 12, by gradually raising the operating speed $N_{MG1}$ of the above-indicated first electric motor MG1 during the control to release the above-indicated friction clutch 92.

Figure 11:
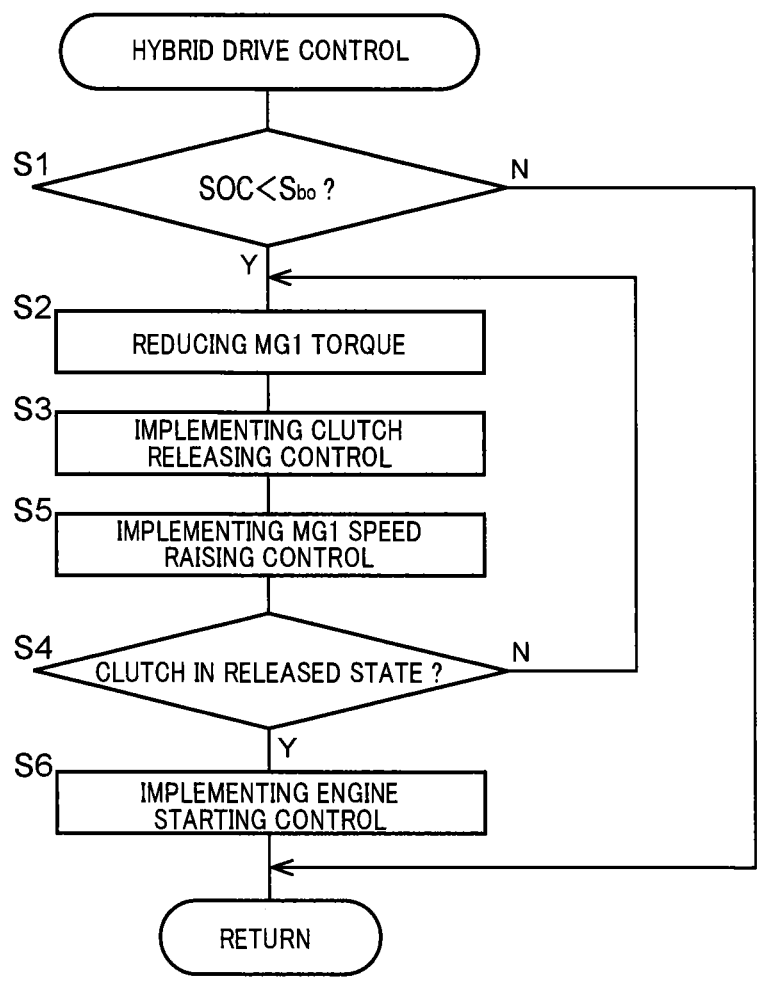
FIG. 11 is a flow chart for explaining major hybrid drive controls of the drive system implemented by the electronic control device according to the embodiment of FIG. 10.

FIG. 11 is the flow chart for explaining major hybrid drive controls of the above-described drive system 90 implemented by the above-described electronic control device 50. This control routine is repeatedly executed with a predetermined cycle time. It is noted that the same numbers are used in FIG. 11 to identify the steps identical with those in FIG. 9, which steps will not be described redundantly. In the control routine of FIG. 11, the releasing control of the above-indicated friction clutch 92 is implemented in S3 following S2 described above, to initiate gradual reduction of the hydraulic pressure Pbcr to be applied to the hydraulic actuator of the friction clutch 92. Then, the control flow goes to S5 to initiate a rise of the operating speed $N_{MG1}$ of the above-indicated first electric motor MG1. The control flow then goes to S4 to determine whether the friction clutch 92 has been changed to its fully released state, namely, whether the above-indicated crankshaft 26 has been released from the housing 28. This determination is made on the basis of a change of the engine speed $N_E$ detected by the above-indicated engine speed sensor 56. For example, the determination is made as to whether the engine speed $N_E$ detected by the above-indicated engine speed sensor 56 a predetermined length of time after the affirmative determination is obtained in S1 has reached the predetermined threshold value $N_{bo}$. If a negative determination is obtained in S4, the control flow goes back to S2 and the subsequent steps. If an affirmative determination is obtained in S4, the control flow goes to S6 and subsequent step described above.

As described above, the illustrated embodiments are configured such that the absolute value of the torque $T_{MG1}$ of the above-indicated first electric motor MG1 is reduced before the locking mechanism in the form of the above-indicated positive clutch 46 or friction clutch 92 is changed from the locking state in which the output shaft in the form of the crankshaft 26 is fixed to the stationary member in the form of the housing 28 while the drive force of the above-indicated first electric motor MG1 is transmitted to the third rotary element in the form of the ring gear R, to the unlocking state in which the locking of the crankshaft 26 by the locking mechanism is released. Accordingly, the reverse operation of the above-indicated engine 12 can be effectively prevented even where the locking mechanism is changed into the unlocking state at an earlier point of time due to a variation of the operating response of the brake actuator provided in the above-indicated locking mechanism, for instance. Namely, the illustrated embodiments provide the electronic control device 50 for the hybrid vehicle, which prevents the reverse operation of the engine 12 upon releasing of locking of the crankshaft 26.

The illustrated embodiments are further configured such that the torque $T_{MG1}$ of the above-described first electric motor MG1 operates the above-described engine 12 in the reverse direction while the drive force of the first electric motor MG1 is transmitted to the above-described ring gear R. Accordingly, the reverse operation of the engine 12 can be effectively prevented upon releasing of locking of the crankshaft 26 by the locking mechanism where the reverse operation of the engine 12 tends to easily take place due to early releasing of locking of the crankshaft 26.

The illustrated embodiments are further configured such that the torque $T_{MG1}$ of the above-described first electric motor MG1 is changed to operate the above-described engine 12 in the forward direction before the above-described locking mechanism is changed from the locking state to the unlocking state. Accordingly, the reverse operation of the engine 12 can be effectively and practically prevented upon releasing of locking of the crankshaft 26 by the locking mechanism.

The illustrated embodiments are also configured such that the second electric motor MG2 is connected to a power transmitting path between the third rotary element in the form of the above-described ring gear R and the wheels 14 provided as drive wheels, and an absolute value of the torque $T_{MG2}$ of the above-indicated second electric motor MG2 is maintained or increased when the absolute value of the torque $T_{MG1}$ of the above-indicated first electric motor MG1 is reduced before the locking mechanism is changed from the locking state to the unlocking state. Accordingly, the reduction of the output torque to be transmitted to the wheels 14 can be effectively prevented upon releasing of locking of the crankshaft 26.

The illustrated embodiments are further configured such that the determination as to whether the crankshaft 26 of the above-described engine 12 has been released from the above-described housing 28 is made, on the basis of a change of the speed of rotation of the crankshaft 26 by the torque of the above-described first electric motor MG1 controlled while the locking mechanism is changed from the locking state to the unlocking state. Accordingly, the releasing of locking of the crankshaft 26 can be suitably and practically detected.

While the preferred embodiments of this invention have been described in detail by reference to the drawings, it is to be understood that the invention is not limited to the details of the illustrated embodiments, but may be embodied with various changes which may occur without departing from the scope of the present invention.

Nomenclature of Reference Signs 10, 90: Hybrid vehicle drive system 12: Engine 14: Wheels (Drive wheels) 16: First driving portion 18: Second driving portion 20: Differential gear device 22: Axles 24: Planetary gear set (Differential mechanism) 26: Crankshaft (Output shaft) 28: Housing (Stationary member) 30: Oil pump 32: Output gear 34: Intermediate output shaft 36: Large-diameter gear 38: Small-diameter gear 40: Input gear 42: Output shaft 44: Second output gear 46: Positive clutch (Locking mechanism) 46a: Engine-side member 46b: Housing-side member 46c: Sleeve 46d: Actuator 48: Hydraulic control unit 50: Hybrid drive control electronic control device 52: Engine control electronic control device 54: Electric motor control electronic control device 56: Engine speed sensor 58: Battery SOC sensor 62: Engine output control device 64: First inverter 66: Second inverter 70: Hybrid drive control portion 72: Engine drive control portion 74: First electric motor drive control portion 76: Second electric motor drive control portion 78: Locking mechanism control portion 80: Locking releasing determining portion 92: Friction clutch (Locking mechanism) CA: Carrier (Second rotary element) MG1: First electric motor MG2: Second electric motor R: Ring gear (Third rotary element) S: Sun gear (First rotary element)

The invention claimed is:

1. A control apparatus for a hybrid vehicle provided with a differential mechanism having a first rotary element, a second rotary element serving as an input rotary member and connected to an engine, and a third rotary element serving as an output rotary member, an electric motor connected to said first rotary element, and a locking mechanism configured to fix an output shaft of said engine to a stationary member, the control apparatus comprising:

an electric motor drive control portion configured to reduce an absolute value of a torque of said electric motor before said locking mechanism is changed from a locking state in which said output shaft is fixed to the stationary member while a drive force of said electric motor is transmitted to said third rotary element, to an unlocking state in which said output shaft is released from the stationary member.

2. The control apparatus according to claim 1, wherein the torque of said electric motor operates said engine in a reverse direction while the drive force of said electric motor is transmitted to the third rotary element.

3. The control apparatus according to claim 1, wherein said electric motor drive control portion increases the torque generated by said electric motor to operate said engine in a forward direction before said locking mechanism is changed from said locking state to said unlocking state during said locking mechanism is changed from said locking state to said unlocking state.

4. The control apparatus according to claim 1, wherein a second electric motor is connected to a power transmitting path between said third rotary element and drive wheels, said second electric motor being provided in addition to said electric motor provided as a first electric motor, said control apparatus further comprising:

a second electric motor control portion configured to maintain or increase an absolute value of a torque of said second electric motor when the absolute value of the torque of said first electric motor is reduced during said locking mechanism is changed from said locking state to said unlocking state, said second electric motor control portion being provided in addition to said electric motor drive control portion provided as a first electric motor control portion.

5. The control apparatus according to claim 1, further comprising:

a locking releasing determining portion configured to make a determination as to whether said output shaft of said engine has been released from said stationary member, on the basis of a change of a speed of rotation of the output shaft by the torque of said electric motor controlled while said locking mechanism is changed from said locking state to said unlocking state.

* * * * *